N. C. LEVY.
FLEXIBLE CHAIN.
APPLICATION FILED JULY 23, 1921.
1,426,885.
Patented Aug. 22, 1922.
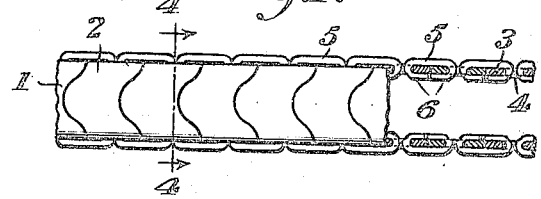
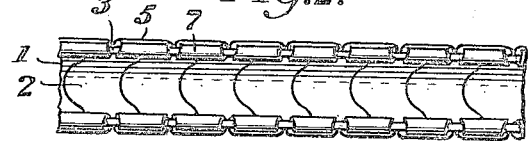
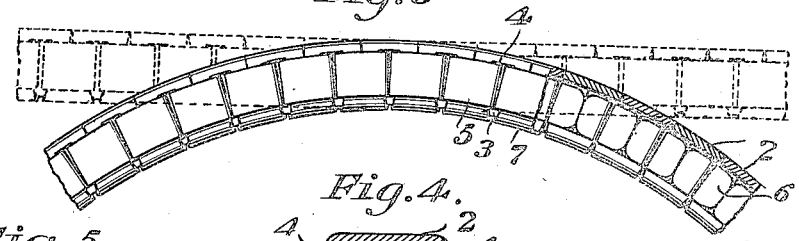
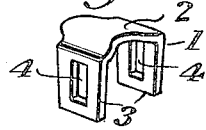
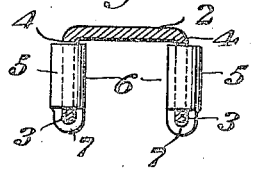
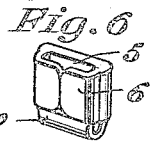
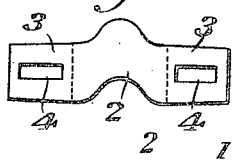
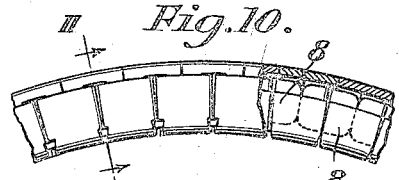
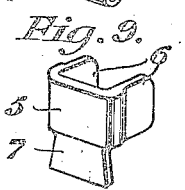
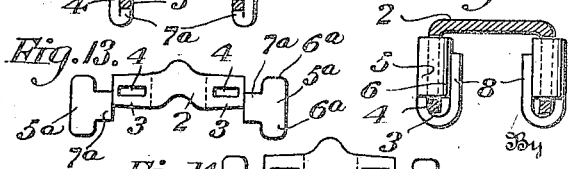
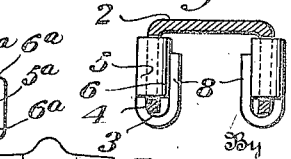
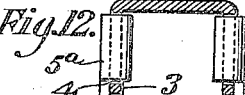
Inventor
Norman C. Levy
his Attorneys

UNITED STATES PATENT OFFICE.

NORMAN C. LEVY, OF NEW YORK, N. Y.

FLEXIBLE CHAIN.

1,426,885.　　　Specification of Letters Patent.　　Patented Aug. 22, 1922.

Application filed July 23, 1921. Serial No. 487,163.

*To all whom it may concern:*

Be it known that I, NORMAN C. LEVY, a citizen of the United States, and resident of the borough of Manhattan, city, county, and State of New York, have invented certain new and useful Improvements in Flexible Chains, of which the following is a specification.

This invention relates to improvements in flexible chains especially adapted for use in jewelry, for instance, for bracelets and the like.

One of the main objects of the invention is to provide a flexible chain of channel formation made up of a series of arch-shape members which form the outer side or surface of the chain, and connecting means which are flexibly joined to the outer links.

Another object of the invention is to provide connecting links with means adapted to cover the joints between said side members and hold them in longitudinal alignment.

One of the advantages of a flexible chain of channel formation is that it is well adapted for use as a bracelet; and because of its open back or inner side it may be studded with jewels, and also may be readily cleaned.

There are other important objects and advantages of the invention which will more fully hereinafter appear.

In the drawing, Fig. 1 is a face view of the outer side of the chain, partly in longitudinal section;

Fig. 2 a face view of the inner side of the chain;

Fig. 3 a side elevation of the chain flexed in full lines and partly in section, the chain being shown straight in dotted lines;

Fig. 4 a transverse sectional view on the line 4—4 of Fig. 1;

Fig. 5 a detail perspective view of one of the arch-shape outer links;

Fig. 6 a detail perspective view of one of the connecting links showing it bent into its final form;

Fig. 7 a detail view of the blank form which the outer links are made;

Fig. 8 a detail view of the blank form from which the connecting links are made;

Fig. 9 a detail perspective view of one of the connecting links after the first bending operation;

Fig. 10 a side elevation partly in section of a slightly modified form of the chain;

Fig. 11 a transverse sectional view taken on the line 11—11 of Fig. 10;

Fig. 12 a transverse sectional view similar to Fig. 4 showing a slightly different form of chain;

Fig. 13 a view of the blanks from which the chain shown in Fig. 12 is formed; and Fig. 14 a view of a one-piece blank adapted to be shaped into a chain of the form shown in Fig. 12.

The chain is made up of a set or series of arch-shape links 1. Each of these links comprises an outer or face member 2 and the two side members 3. The side members are preferably bent at right angles to the outer face member and are each perforated as at 4. These links are arranged side by side and close together so that the joints between them run transversely of the chain, the side members forming portions of the sides of the chain. The side members are slightly tapered from the face member 2, so that the free ends thereof are slightly narrower than the ends connected to said face member. The transverse edges of the outer face members are curved or offset in order to give the outer side of the chain a pleasing appearance; and this offset may be made of any suitable shape.

The connecting links each comprise a body part 5; two end lug portions 6 and a tail piece or extension 7 connected to the middle of one edge of the body part 5. The lug 6 and extension 7 are slightly reduced in thickness in order that they may be readily bent, as hereinafter described.

The blank shown in Fig. 7 for the outer arch-shape links is first bent to the form shown in Fig. 5. The connecting links are first bent to the form shown in Fig. 9. In this form the lugs 6 are passed through the perforations 4 of adjoining outer links and are then bent toward each other to flexibly connect the outer links together, as shown clearly in Figs. 1 and 6. The extension 7 is then bent round under the edges of the side members 3 of adjoining outer links, as shown clearly in Fig. 4. The connecting links, as shown clearly in Fig. 3, cover the greater part of the joints between the side members of the outer links; and the tail pieces or extensions 7 cover the edges of the side members 3 of said outer links. As shown in the drawings, two connecting links are connected to each side member of the outer links, one of the lugs of each of said connecting links extending through the perforations in said side member. The extension 7 serves as means to hold the ends of the side members 3 in longitudinal alignment. The joints between the chain links must be substantially loose to permit the chain to be flexed, and the bent-over extensions prevent the links 1 getting out of alignment along the open side of the chain. When the chain is used for a bracelet, the open side of the chain is next to the wearer and it is desirable that the edges which contact with the wearer should be kept in substantially longitudinal alignment and that a smooth surface be provided along the edges of the chain. The extension 7 serves these purposes.

In Figs. 10 and 11 the tail pieces or extension 7 are longer than those shown in the other figures of the drawing and extend over the clinched lugs 6, as shown at 8 in said figures. These bent-over lugs 8 serve as means for locking the clinched lugs 6.

The connections between the connecting links and the side members of the outer links are sufficiently loose to permit the chain to be flexed, as shown in Fig. 3, the tapered side members of the outer links permitting of this flexing or bending of the completed chain. Because of the tapered formation of the side members of the outer links the chain may be flexed or bent without undue separation of the outer or face members of the links.

In Fig. 12 the extensions 7ª of the connecting links are bent around and their ends are brought directly in contact with the edges of the side members 3 of the links 1. In this position they serve as means to maintain the ends of the side members in substantially longitudinal alignment and also present a smooth surface to the wearer of a bracelet made up from this chain. If desired the connecting links 5ª may be rigidly attached to the ends of the side members 3 by means of solder, or otherwise.

In Fig. 13 is illustrated the position of the connecting links 5ª when permanently secured to the ends of the blank from which the links 1 are made. As there shown, the extension 7ª is connected to the ends of the side members 3 but are offset in such manner that when the lugs 6ª are bent up they are properly positioned to enter the apertures 4 in adjoining links 1.

In Fig. 14 the connecting links and the blank for the arch-shape links 1 are formed in one piece instead of being connected together as shown in Fig. 13. A chain made up from the construction shown in Figs. 13 and 14 would in cross-section be substantially as shown in Fig. 12. In this form of chain the connecting means would be rigidly attached to one of the arch-shape links 1 and loosely or flexibly connected to the adjoining links 1.

It is manifest that the chain made up as shown and described herein is of channel form and may be readily cleaned. It is also manifest that because of its channel formation it may be properly set with diamonds or other jewels and that the jewels will be accessible and may be readily cleaned and light will be admitted to the jewels to get the best effects.

A chain made up as described is very pleasing in appearance; is simple to manufacture for the reason that simple stampings are used and these are connected together without the use of solder and without the use of any fastening means except the links themselves. Such a chain is especially adapted for use in jewelry and may be made up into bracelets and the like.

What I claim is:

1. A flexible chain of channel form open on its inner side and comprising a series of arch-shape outer links arranged side by side to form a channel and having their side members apertured, and connecting links bridging the joints between the side members of the outer links each of said connecting links being formed with lugs extending through apertures in the side members of the adjacent outer links said lugs being bent laterally and clinched within the channel formed by the outer links the side members of each outer link being flexibly secured to the side members of adjacent outer links by two of said connecting links.

2. A flexible chain of channel form open on its inner side and comprising a series of arch-shape outer links arranged side by side to form a channel and having their side members apertured, connecting links bridging the joints between the side members of the outer links each of said connecting links being formed with lugs extending through apertures in the side members of the adjacent outer links said lugs being bent laterally and clinched within the channel formed by the outer links, the side members of each outer link being flexibly secured to the side members of adjacent outer links by two of said connecting links, and extensions formed on the connecting links said extensions being bent around the edges of the side members of the outer links.

3. A flexible chain of channel form open on its inner side and comprising a series of arch-shape outer links arranged side by side to form a channel and having their side members apertured, connecting links bridging the joints between the side members of the outer links each of said connecting links being formed with lugs extending through apertures in the side members of the adjacent outer links said lugs being bent laterally and clinched within the channel formed by the outer links, the side members of each outer link being flexibly secured to the side members of adjacent outer links by two of said connecting links, and extensions formed on the connecting links said extensions being bent around the edges of the side members of the outer links and extending over the clinched lugs.

4. A flexible chain of channel form open on its inner side and comprising a series of arch-shape outer links arranged side by side to form a channel the side members of said outer links being apertured, and connecting links bridging the joints between the side members of the outer links each of said connecting links being formed with lugs extending through apertures in the side members of adjacent outer links.

5. A flexible chain of channel form open on its inner side and comprising a series of arch-shape outer links arranged side by side to form a channel the side members of said outer links being apertured, connecting means bridging the joints between the side members of the outer links each of said connecting means being formed with lugs extending through apertures in the side members of adjacent outer links, and provided with extensions bridging the joints between side adjacent outer links and engaging the ends thereof to hold them in substantially longitudinal alignment and to form a substantially smooth wearing surface.

In testimony whereof I hereunto affix my signature.

NORMAN C. LEVY.